(12) United States Patent
Shen et al.

(10) Patent No.: US 9,270,159 B2
(45) Date of Patent: Feb. 23, 2016

(54) EMI FILTER USING ACTIVE DAMPING WITH FREQUENCY DEPENDANT IMPEDANCE

(75) Inventors: Miaosen Shen, Vernon, CT (US); Ming Li, West Hartford, CT (US); Lei Xing, East Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 762 days.

(21) Appl. No.: 13/568,578

(22) Filed: Aug. 7, 2012

(65) Prior Publication Data

US 2014/0043871 A1 Feb. 13, 2014

(51) Int. Cl.
*H02M 1/12* (2006.01)

(52) U.S. Cl.
CPC .................... *H02M 1/12* (2013.01)

(58) Field of Classification Search
CPC ..................................................... H02M 1/12
USPC ..................................................... 363/39–43
See application file for complete search history.

(56) References Cited

U.S. PATENT DOCUMENTS

| | | | |
|---|---|---|---|
| 5,530,396 A * | 6/1996 | Vlatkovic et al. | 327/552 |
| 6,690,230 B2 | 2/2004 | Pelly | |
| 6,775,157 B2 | 8/2004 | Honda | |
| 7,595,687 B2 * | 9/2009 | Mortensen et al. | 327/551 |
| 7,738,268 B2 * | 6/2010 | Baudesson et al. | 363/39 |
| 2003/0128558 A1 | 7/2003 | Takahashi et al. | |
| 2004/0264220 A1 | 12/2004 | Briere et al. | |
| 2008/0024951 A1 | 1/2008 | Mortensen et al. | |
| 2008/0180164 A1 | 7/2008 | Pelly | |
| 2011/0215777 A1 * | 9/2011 | Braylovskiy et al. | 323/234 |

OTHER PUBLICATIONS

Ogasawara et al., "An Active Circuit for Cancellation of Common-Mode Voltage Generated by a PWM Inverter," IEEE Transactions on Power Electronics, vol. 13, No. 5, Sep. 1998.
Son et al., "A New Active Common-Mode EMI Filter for PWM Inverter," IEEE Transactions on Power Electronics, vol. 18, No. 6, Nov. 2003.
Heldwein et al., "Implementation of a Transformerless Common-Mode Active Filter for Offline Converter Systems," IEEE Transactions on Industrial Electronics, vol. 57, No. 5, May 2010.
Xing et al., "Optimal Damping of EMI Filter Input Impedance," IEEE Transactions on Industry Applications, vol. 47, No. 3, May/Jun. 2011.

* cited by examiner

*Primary Examiner* — Timothy J Dole
*Assistant Examiner* — Htet Z Kyaw
(74) *Attorney, Agent, or Firm* — Kinney & Lange, P.A.

(57) ABSTRACT

A circuit for providing damping in an electromagnetic interference (EMI) filter with an inductor-capacitor (LC) circuit, includes at least one capacitor connected to receive a common-mode current from the LC circuit; a current sensor that senses the common-mode current; a linear amplifier that amplifies the sensed common-mode current; and a power amplifier that receives the amplified sensed common-mode current and outputs a voltage which creates a damping impedance for frequencies of the common-mode current less than a threshold frequency and absorbs the common-mode current for frequencies greater than the threshold frequency.

14 Claims, 5 Drawing Sheets

EMI FILTER USING ACTIVE DAMPING WITH FREQUENCY DEPENDANT IMPEDANCE

BACKGROUND

The present invention relates to electromagnetic interference (EMI) filtering, and in particular to a system and method for filtering EMI using active damping with frequency dependant impedance.

Three-phase inverters are widely used in industrial applications, particularly for driving electric motors. Inverters include at least one semiconductor device, such as a metal-oxide-semiconductor field-effect transistor (MOSFET) that operates in a switching mode at a given frequency. High switching speeds of the transistors lead to better power quality for the inverter, but also lead to greater electromagnetic interference (EMI).

For motor drive applications designated as "class A" industrial applications, the common-mode EMI is categorized into two types: conducted type and radiated type. Conducted type EMI consists of frequencies between approximately 150 kHz and 30 MHz. Radiated type EMI consists of frequencies beyond 30 MHz. Various EMI standards and specifications are in place to regulate EMI for these applications, particularly conducted type EMI.

In order to combat the effects of EMI from the power inverter, passive filters have been adopted between the inverter and the load, and/or between the direct current (DC) power supply and the inverter. Generally, passive filters employ an inductor-capacitor (LC) filter with a low-pass characteristic. These LC filters have a natural resonance frequency. Because of this, damping resistors have traditionally been employed to counteract the effect of this resonance.

SUMMARY

A system for filtering electromagnetic interference (EMI) between a power source and a load includes a low-pass filter and an active damping circuit. The low-pass filter comprises at least one inductor and at least one capacitor that filters EMI generated by the power source. The active damping circuit is connected to receive common-mode current from the at least one inductor. The active damping circuit provides a damping impedance for frequencies of the common-mode current less than a threshold frequency, and provides an impedance less than the damping impedance for frequencies of the common-mode current greater than the threshold frequency.

DETAILED DESCRIPTION

The present invention describes a system and method for providing electromagnetic interference (EMI) filtering using active damping. An active damping circuit is utilized in conjunction with an inductor-capacitor (LC) circuit to filter EMI generated by switching of a power inverter. The LC circuit, which includes a common-mode choke, has a low-pass characteristic with a given resonant frequency. The active damping circuit, which includes a current sensor, a linear amplifier circuit, and a power amplifier circuit, acts as a virtual resistor for low frequencies, including the resonant frequency of the LC circuit, which provides damping for the EMI filter. At higher frequencies, the active damping circuit provides a very low impedance, providing a path to ground for the common-mode current, which provides better attenuation of the common-mode noise than a passive resistor. All components of the active damping circuit are lightweight, and can be implemented on a single printed circuit board (PCB), which greatly reduces the weight compared to an EMI filter with a passive damping resistor.

Figure 1:
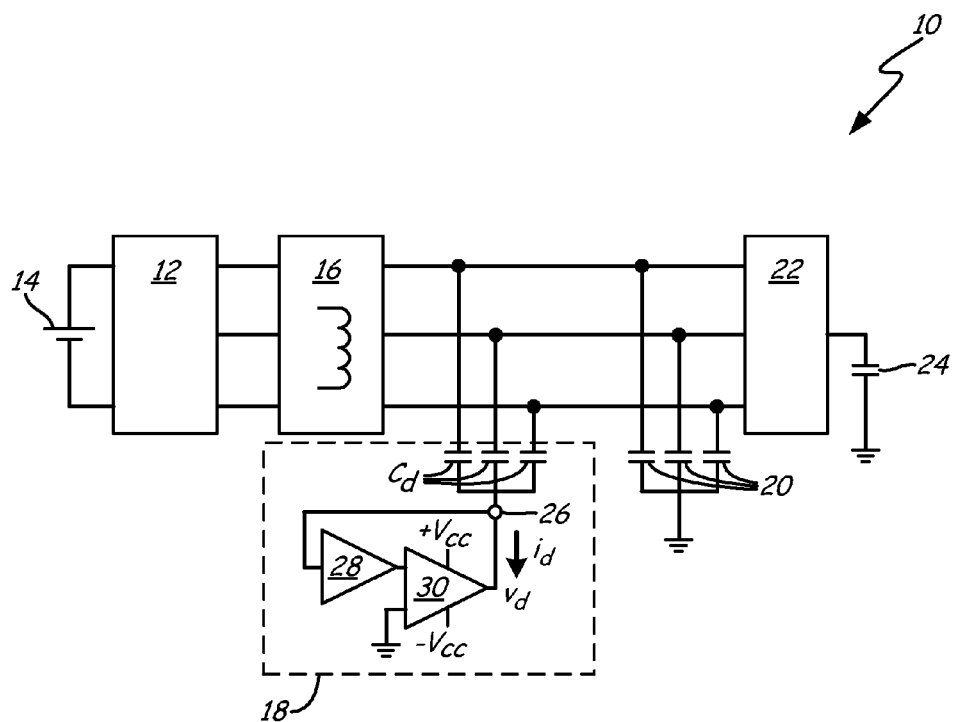
FIG. 1 is a block diagram illustrating a system for providing active damping according to an embodiment of the present invention.

FIG. 1 is a block diagram illustrating a system 10 for filtering EMI using active damping between a power inverter 12 (which receives power from a direct current (DC) power supply 14), and a load 22 according to an embodiment of the present invention. System 10 includes common-mode (CM) choke 16, active damping circuit 18, and capacitors 20. Load 22 includes stray capacitor 24, which is representative of the stray capacitance in load 22. Active damping circuit 18 includes damping capacitors $C_d$, current sensor 26, linear amplifier circuit 28, and power amplifier circuit 30. Although illustrated as a three phase inverter with active damping circuit 18 utilized between power inverter 12 and load 22, active damping circuit 18 can be employed in a number of EMI filter applications including, for example, between a power grid and a rectifier. Active damping circuit 18 may also be included between power supply 14 and power inverter 12 to reduce the EMI noise level of DC power supply 14.

CM choke 16 and capacitors 20 form an LC circuit that acts as a low-pass filter for the EMI generated by power inverter 12. This LC circuit has a known resonant frequency based upon the values of the inductance of CM choke 16 and of the capacitance of capacitors 20. This resonance can increase the amplitude of the common-mode current through stray capacitor 24.

Active damping circuit 18 provides damping for the resonance created by the LC circuit. Common-mode current ($i_d$) flows into active damping circuit 18. The current ($i_d$) flows through capacitors $C_d$ and is sensed by current sensor 26. The sensed current is provided to linear amplifier circuit 28 which amplifies the sensed current and provides the amplified current to power amplifier circuit 30. Linear amplifier circuit 28 comprises several linear amplifiers that, along with power amplifier circuit 30, form a positive feedback closed-loop circuit with low-pass characteristics. The corner frequency of the low-pass characteristic is set to a value that is greater than the resonant frequency of the LC circuit, but much lower than the common-mode conducted EMI frequency, which is beyond 150 kHz. This corner frequency may be, for example, 11 kHz. For better performance, the low-pass characteristic of the closed loop circuit may be implemented as a second or higher order low-pass filter.

Power amplifier circuit 30 outputs a voltage ($V_d$) that causes active damping circuit 18 to act as a virtual resistor for lower frequencies of current ($i_d$). The virtual impedance of active damping circuit 18 is therefore equal to $V_d/i_d$. The closed loop circuit has a proportional gain and thus, the virtual impedance remains constant for frequencies of current ($i_d$) below the corner frequency of the low-pass characteristic. The virtual impedance is set to a value adequate to provide damping for the LC circuit, such as 150 ohms.

For higher frequencies of current ($i_d$), such as those greater than the corner frequency of the low-pass characteristic of the closed loop circuit, power amplifier circuit 30 absorbs this common-mode noise current by providing a very low impedance. Because active damping circuit 18 is implemented with a low-pass characteristic, the output voltage of power amplifier circuit 30 is very low for frequencies of current ($i_d$) above the corner frequency. Because of this, the value of impedance ($V_d/i_d$) is very low. By providing a very low impedance for higher frequencies, active damping circuit 18 provides a path to ground for the high-frequency common-mode current. This provides further attenuation for the EMI generated by power inverter 12. This way, the common-mode current through stray capacitor 24 can be greatly reduced.

Figure 2:
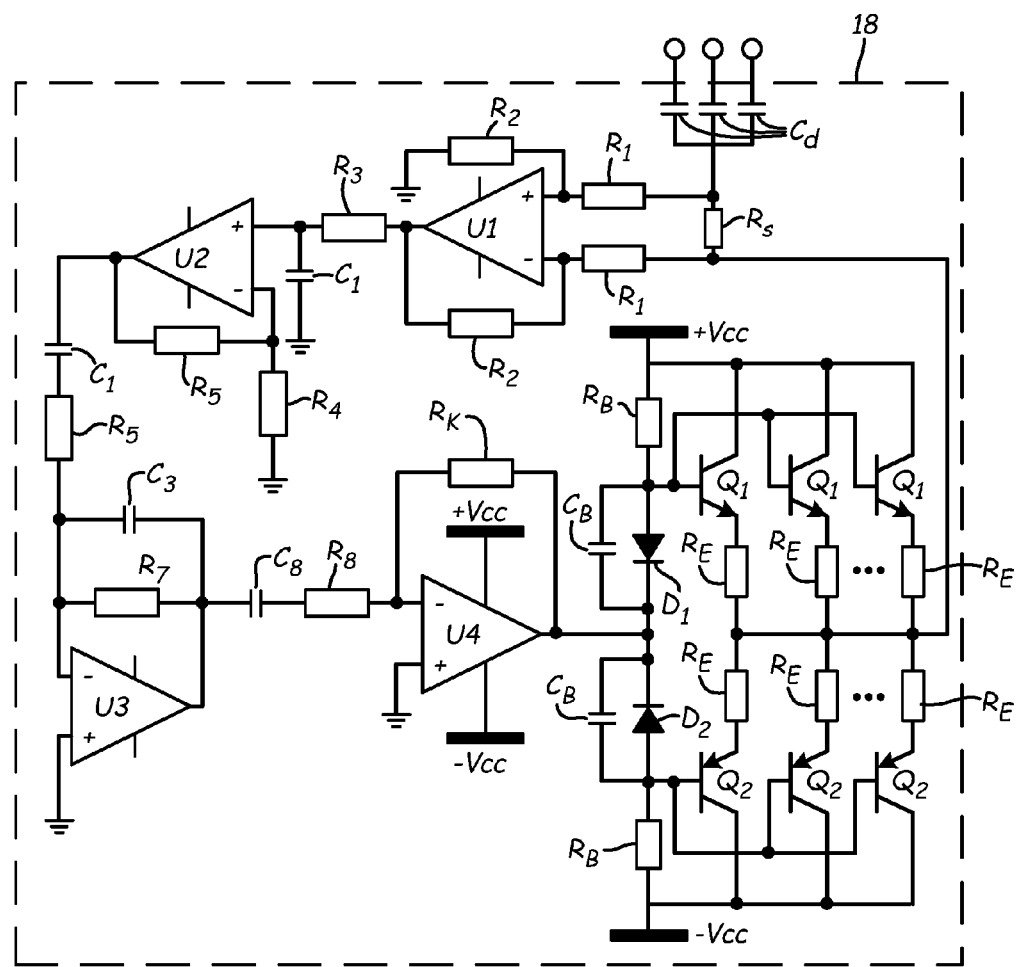
FIG. 2 is a circuit diagram illustrating an active damping circuit according to an embodiment of the present invention.

FIG. 2 is a circuit diagram illustrating active damping circuit 18 according to an embodiment of the present invention. Current sensor 26 is implemented using shunt resistor $R_S$. Linear amplifier circuit 28 includes operational amplifiers (op-amps) $U_1$-$U_4$, resistors $R_1$-$R_8$ and $R_K$, and capacitors $C_1$-$C_4$. Power amplifier circuit 30 includes transistors $Q_1$ and $Q_2$, resistors $R_E$ and $R_B$, diodes $D_1$ and $D_2$, and capacitors $C_B$.

Op-amp $U_1$ is implemented as a differential amplifier which is used for current sensing. Resistor $R_3$ and capacitor $C_1$ act as a first low-pass filter. Op-amp $U_2$ is a positive proportional amplifier for amplifying the output voltage of the first low-pass filter. Capacitor $C_2$ and resistor $R_6$ form a high-pass filter with a low corner frequency to remove the DC components in the output voltage of op-amp $U_2$, which arise from the DC components in the output voltage of $U_2$. Op-amp $U_3$, resistors $R_6$ and $R_7$, and capacitor $C_3$ form a second low-pass filter with an inverted output. Capacitor $C_4$, resistors $R_8$ and $R_K$, and op-amp $U_4$ form another high-pass filter with a low corner frequency, which is used to remove the DC components in the output voltage of op-amp $U_3$. The proportional gain of this high-pass filter is equal to $R_K/R_8$.

The output voltage of op-amp $U_4$ is provided to power amplifier circuit 30, which comprises a push-pull voltage follower used to absorb the common-mode current ($i_d$) in active damping circuit 18. Power amplifier circuit 30 uses N-channel and P-channel transistors to provide the push-pull circuit function that operates in class AB mode. Diodes $D_1$ and $D_2$ are used to provide a voltage drop which is larger than the turn-on voltage of transistors $Q_1$ and $Q_2$. Resistors $R_B$ and $R_E$ are used to set the operating point of power amplifier circuit 30 in order to ensure operation of transistors $Q_1$ and $Q_2$ in the active range. Capacitor $C_B$ is utilized to reduce the phase error between the output voltage of op-amp $U_4$ and the gate voltage of transistors $Q_1$ and $Q_2$. Multiple parallel transistors $Q_1$ and $Q_2$ are implemented to reduce the power dissipation in each transistor which in turn avoids possible thermal runaway. Power amplifier circuit 30 utilizes an isolated power supply with positive and negative output voltages which absorb the current ($i_d$) in active damping circuit 18. The power supply rating of op-amp $U_4$ is the same as power amplifier circuit 30.

Figure 3:
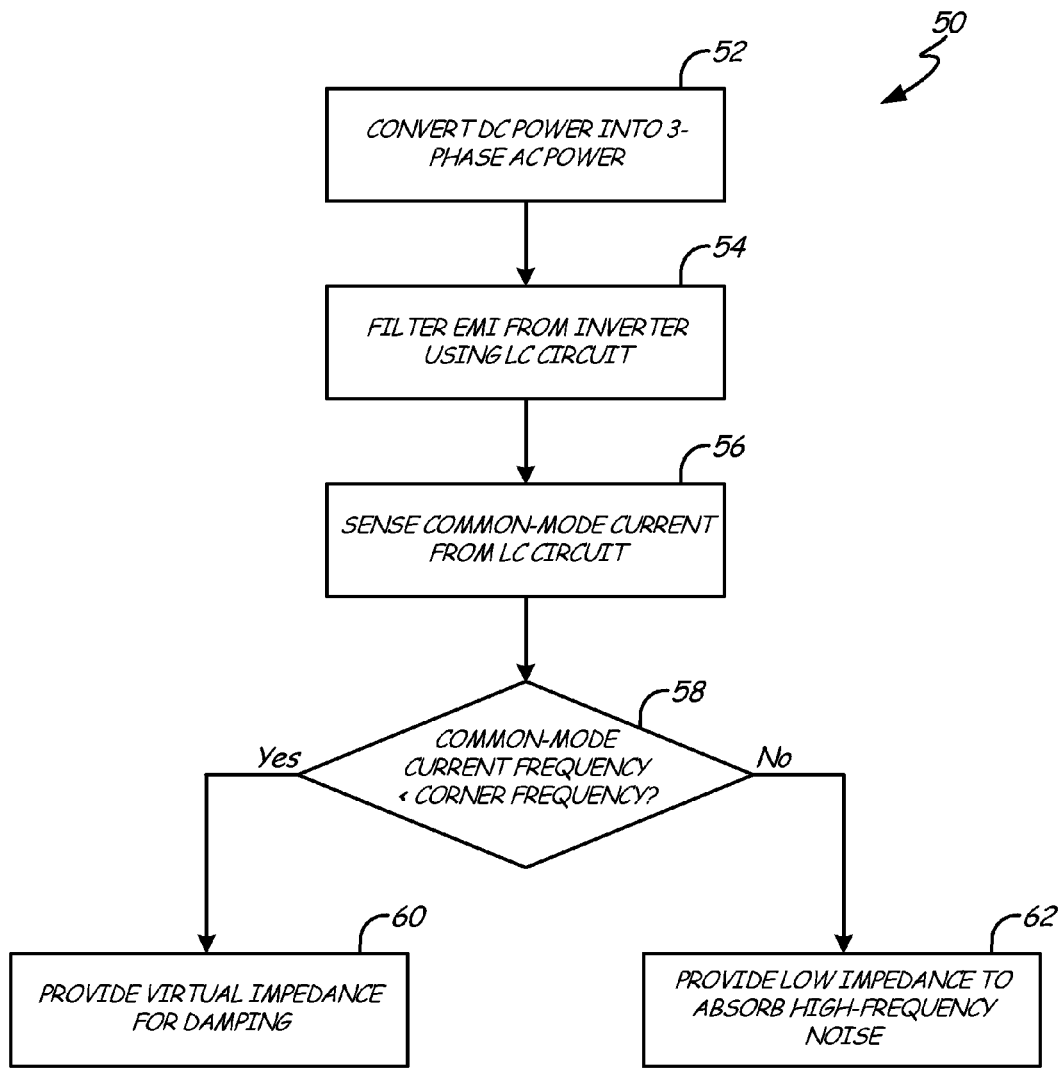
FIG. 3 is a flowchart illustrating a method of providing active damping according to an embodiment of the present invention.

FIG. 3 is a flowchart illustrating method 50 for providing EMI filtering using active damping. At step 52, power inverter 12 converts DC power from power supply 14 into three-phase alternating current to provide power to load 22. EMI is generated by power inverter 12. At step 54, the LC circuit comprising CM choke 16 and capacitors 20 provides low-pass filtering for the EMI generated by power inverter 12. At step 56, current ($i_d$) is sensed by current sensor 26. At step 58, it is determined if the frequency of current ($i_d$) is less than a corner frequency of the low-pass characteristic of active damping circuit 18. If it is, method 50 proceeds to step 60 and power amplifier circuit 30 provides an output voltage ($V_d$) to form a virtual resistor to provide damping for system 10. If the current ($i_d$) is greater than the corner frequency, method 50 proceeds to step 62 and active damping circuit provides a very low impedance to absorb the common-mode high frequency noise current.

Figure 4:
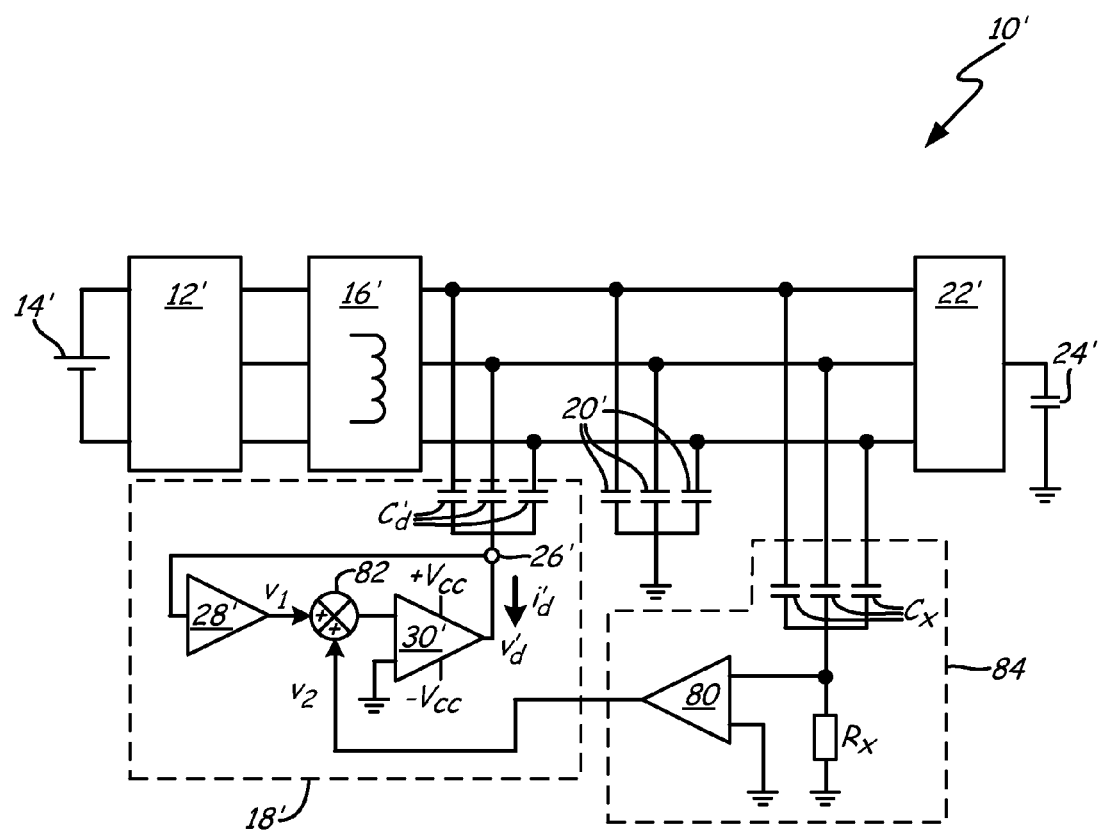
FIG. 4 is a block diagram illustrating a system for providing active damping with voltage feedback according to an embodiment of the present invention.

FIG. 4 is a block diagram illustrating a system 10' for providing active damping with voltage feedback according to a separate embodiment of the present invention. All references with prime designations have similar function to corresponding references in FIG. 1. Voltage feedback circuit 84 includes capacitors $C_x$, resistor $R_x$, and linear amplifier 80. Active damping circuit 18' further includes adder circuit 82. In active damping circuit 18 of FIG. 2, the equivalent impedance of the circuit is limited by shunt resistor $R_S$ in the high frequency range of EMI. Voltage feedback, as accomplished using voltage feedback circuit 84 can further reduce the equivalent impedance of active damping circuit 18'. A common-mode voltage sensor is implemented using capacitors $C_x$. Capacitors $C_x$ and resistor $R_x$ act as a high-pass filter. Linear amplifier circuit 80 amplifies the sensed voltage and provides the amplified voltage to adder circuit 82. Adder circuit 82 outputs a voltage which is in proportion to the sum of the amplified current and voltage, and provides this voltage to power amplifier circuit 30'.

Adder circuit 82 is implemented as a linear amplifier. Capacitors $C_x$, Resistor $R_x$, linear amplifier circuit 80, adder circuit 82 and power amplifier circuit 30', form a negative feedback based closed-loop circuit with high-pass characteristic. The corner frequency of the high-pass characteristic is set to a value that is near 150 kHz. For better performance, the high-pass characteristic of the closed loop circuit may be implemented as a second or higher order high-pass filter.

Figure 5:
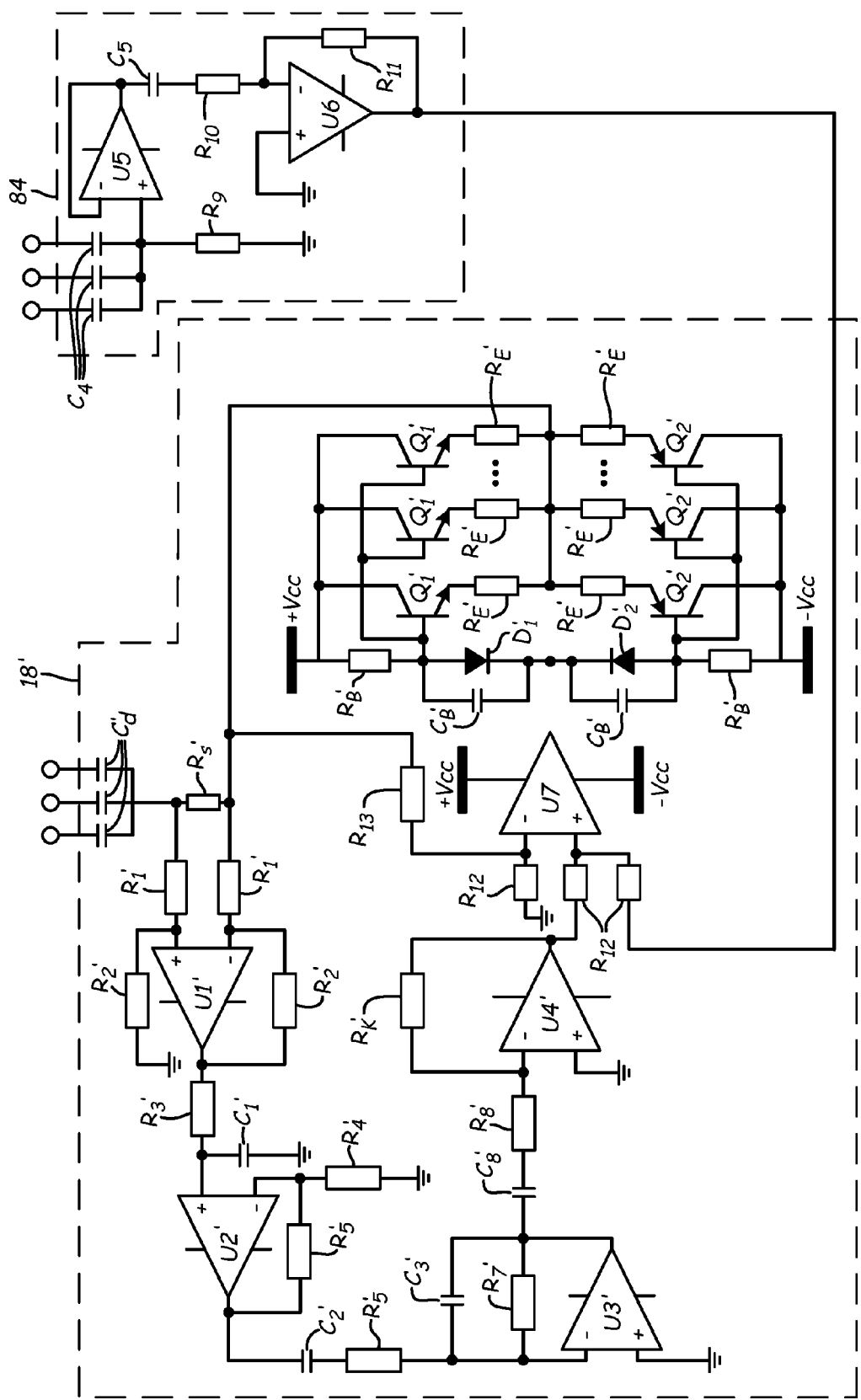
FIG. 5 is circuit diagram illustrating an active damping circuit with voltage feedback according to an embodiment of the present invention.

FIG. 5 is a circuit diagram illustrating active damping circuit 18' with voltage feedback circuit 84 according to an embodiment of the present invention. All references with prime designations have similar function to corresponding references in FIG. 2. Voltage feedback circuit 84 includes capacitors $C_4$ and $C_5$, resistors $R_9$-$R_{11}$, and op-amps $U_5$ and $U_6$. A voltage sensor is implemented using capacitors $C_4$ and resistor $R_9$, which also acts as a first high-pass filter. Linear amplifier circuit 80 includes op-amps $U_5$ and $U_6$, resistors $R_{10}$ and $R_u$, and capacitor $C_5$. Adder circuit 82 includes op-amp $U_7$, and resistors $R_{12}$ and $R_{13}$.

Op-amp $U_5$ is implemented as a voltage follower which is used for signal isolation. Op-amp $U_6$, capacitor $C_5$, and resistors $R_{10}$ and $R_{11}$ form the second high-pass filter with an inverted output. The proportional gain of this high-pass filter is $R_{11}/R_{10}$.

Op-amp $U_7$, and resistors $R_{12}$ and $R_{13}$ are implemented as an adder which is utilized to obtain the sum of amplified current and voltage from linear circuits 28' and 80, respectively. The gain of this adder is $(1+R_{13}/R_{12})/2$. $R_{13}$ connects to the output of the push-pull circuit to further reduce the output impedance of the push-pull circuit and therefore reduce the active damping impedance. The power supply rating of op-amp $U_7$ is the same as power amplifier circuit 30'.

In this way, the present invention describes a system and method for providing EMI filtering with active damping. Although the present invention has been described with reference to preferred embodiments, workers skilled in the art will recognize that changes may be made in form and detail without departing from the spirit and scope of the invention.

The invention claimed is:

1. A circuit for providing damping in an electromagnetic interference (EMI) filter that includes an inductor-capacitor (LC) circuit, the circuit comprising:

at least one capacitor connected to receive a common-mode current from the LC circuit;

a current sensor configured to sense the common-mode current;

a voltage sensor configured to sense a common-mode voltage from the LC circuit;

a first linear amplifier configured to output a first amplified voltage indicative of the sensed common-mode current;

a second linear amplifier configured to output a second amplified voltage indicative of the sensed common-mode voltage;

an adder circuit configured to sum the first and second amplified voltages and output a summed voltage; and a power amplifier configured to receive the summed voltage and output a voltage which creates a damping impedance for frequencies of the common-mode current less than a threshold frequency and absorbs the common-mode current for frequencies greater than the threshold frequency.

2. The circuit of claim 1, wherein the current sensor comprises a shunt resistor.

3. The circuit of claim 1, wherein the power amplifier comprises a diode biasing push-pull voltage follower.

4. The circuit of claim 1, wherein the LC circuit has a resonant frequency, and the current sensor, linear amplifier, and power amplifier form a closed loop circuit with a low-pass characteristic, having a corner frequency greater than the resonant frequency of the LC circuit.

5. The circuit of claim 4, wherein the threshold frequency is equal to the corner frequency of the closed loop circuit.

6. A system for filtering electromagnetic interference (EMI) between a power source and a load, the system comprising:

a low-pass filter comprising at least one inductor and at least one capacitor that filters EMI generated by the power source;

an active damping circuit connected to receive common-mode current from the at least one inductor, wherein the active damping circuit provides a damping impedance for frequencies of the common-mode current less than a threshold frequency, and provides an impedance less than the damping impedance for frequencies of the common-mode current greater than the threshold frequency; and a voltage feedback circuit connected to receive common-mode voltage from the at least one inductor, wherein the voltage feedback circuit provides a sensed voltage to the active damping circuit to further reduce the damping impedance for frequencies of the common-mode current greater than the threshold frequency, wherein the voltage feedback circuit comprises:

a voltage sensor that includes at least one sense capacitor and a sense resistor; and a first linear amplifier that amplifies the voltage across the sense resistor;

wherein the active damping circuit comprises:

at least one damping capacitor;

a current sensor that senses the common-mode current;

a second linear amplifier that amplifies a sensed current from the current sensor;

an adder circuit that sums a voltage from the first linear amplifier circuit with a voltage from the second linear amplifier circuit; and a power amplifier that outputs a voltage to control an impedance of the active damping circuit.

7. The system of claim 6, wherein the current sensor comprises a shunt resistor.

8. The system of claim 6, wherein the power amplifier comprises a diode biasing push-pull voltage follower.

9. The system of claim 6, wherein the low-pass filter has a resonant frequency, and the current sensor, linear amplifier, and power amplifier form a closed loop circuit with a low-pass characteristic, having a corner frequency greater than the resonant frequency of the low-pass filter.

10. The system of claim 9, wherein the threshold frequency is equal to the corner frequency of the closed loop circuit.

11. A method for filtering electromagnetic interference (EMI) between a power source and a load, the method comprising:

filtering EMI from the power source using a low-pass filter comprising at least one inductor and at least one capacitor;

sensing a common-mode current from the one or more inductors using a current sensor;

sensing a common-mode voltage from the one or more inductors using a voltage sensor;

outputting a first amplified voltage indicative of the common-mode current using a first linear amplifier circuit;

outputting a second amplified voltage indicative of the common-mode voltage using a second linear amplifier circuit;

outputting a summed voltage indicative of a sum of the first and second amplified voltages;

providing the summed voltage to a power amplifier circuit;

outputting a damping voltage using the power amplifier circuit that provides a damping impedance based on the damping voltage and the common-mode current; and providing an impedance less than the damping impedance for frequencies of the common-mode current higher than the frequency threshold to absorb EMI noise from the at least one inductor using the active damping circuit.

12. The method of claim 11, wherein the current sensor comprises a shunt resistor.

13. The method of claim 11, further comprising:

filtering frequencies of the common-mode current above a corner frequency of a low-pass characteristic.

14. The method of claim 11, wherein providing an impedance less than the damping impedance for frequencies of the common-mode current higher than the frequency threshold comprises:

filtering frequencies of the common-mode current above a corner frequency of a low-pass characteristic; and outputting a negligible voltage using the power amplifier circuit to absorb the common-mode current above the corner frequency.

* * * * *